United States Patent
Ardanaz et al.

(10) Patent No.: US 10,048,738 B2
(45) Date of Patent: Aug. 14, 2018

(54) HIERARCHICAL AUTONOMOUS CAPACITANCE MANAGEMENT

(71) Applicant: Intel Corporation, Santa Clara, CA (US)

(72) Inventors: Federico Ardanaz, Hillsboro, OR (US); Jonathan Eastep, Portland, OR (US); Richard Greco, West Linn, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/060,326

(22) Filed: Mar. 3, 2016

(65) Prior Publication Data

US 2017/0255247 A1 Sep. 7, 2017

(51) Int. Cl.
| G06F 1/26 | (2006.01) |
| G06F 1/28 | (2006.01) |
| G06F 1/32 | (2006.01) |

(52) U.S. Cl.
CPC .......... G06F 1/3237 (2013.01); G06F 1/266 (2013.01); G06F 1/26 (2013.01); G06F 1/28 (2013.01)

(58) Field of Classification Search
None
See application file for complete search history.

(56) References Cited

U.S. PATENT DOCUMENTS

| 2008/0263373 A1* | 10/2008 | Meier | G06F 9/3017 713/300 |
| 2009/0089602 A1* | 4/2009 | Bose | G06F 1/206 713/340 |
| 2010/0211807 A1 | 8/2010 | Akimoto | |
| 2010/0332871 A1* | 12/2010 | Allalouf | G06F 9/5094 713/320 |
| 2011/0010566 A1 | 1/2011 | Bandholz et al. | |
| 2011/0029787 A1 | 2/2011 | Day et al. | |
| 2012/0023345 A1 | 1/2012 | Naffziger et al. | |
| 2012/0254643 A1* | 10/2012 | Fetzer | G06F 1/324 713/320 |
| 2014/0143558 A1* | 5/2014 | Kuesel | G06F 1/26 713/300 |
| 2015/0185814 A1* | 7/2015 | Ping | G06F 1/206 713/323 |
| 2016/0378172 A1* | 12/2016 | Alexander | G06F 3/0625 713/320 |

FOREIGN PATENT DOCUMENTS

KR 1020100111254 A 10/2010

OTHER PUBLICATIONS

International Search Report and Written Opinion for International Patent Application No. PCT/US2017/016767, dated May 23, 2017, 15 pages.

* cited by examiner

Primary Examiner — Ji H Bae
(74) Attorney, Agent, or Firm — Jordan IP Law, LLC

(57) ABSTRACT

Apparatus and methods may provide for a central power control unit to grant a power allowance to each of a plurality of computer components and to allocate a shared power pool locally accessible to each of the plurality of computer components when one or more of the plurality of components needs to exceed its granted power allowance.

21 Claims, 5 Drawing Sheets

US 10,048,738 B2

HIERARCHICAL AUTONOMOUS CAPACITANCE MANAGEMENT

GOVERNMENT INTEREST STATEMENT

This invention was made with Government support under contract number H98230-13-D-0124 awarded by the Department of Defense. The Government has certain rights in this invention.

TECHNICAL FIELD

Embodiments generally relate to power allocation in computer systems. More particularly, embodiments relate to power allocation using granted power levels and shared power pools.

BACKGROUND

The scale and performance of large computer systems may be limited by power constraints. For example, power delivery systems may have limits in the amount of current that they can supply. Dynamic Voltage-Frequency Scaling (DVFS) may be used to adjust hardware performance to varying levels of demand. When dynamically selecting voltage and frequency points, a design may require a guarantee that the power delivery current limit is not exceeded. Maximum current may depend on the voltage-frequency decision and the dynamic capacitance ($C_{dyn}$) of the circuits/components. For circuits/components exhibiting a wide dynamic capacitance range, ensuring that no current violation occurs may limit the maximum operating frequency, which in turn may limit performance.

To maximize performance, different operation modes may be established for circuits/components such that different dynamic capacitance limits are enforced. Set dynamic capacitance levels may enable circuits/components to operate at higher frequencies than they would otherwise as long as the workload being performed does not exceed the set dynamic capacitance level. When a circuit/component needs to exceed its set dynamic capacitance level, the circuit/component may a) request a higher set dynamic capacitance level and b) throttle its pipeline as needed to ensure that the dynamic capacitance level comports with the set level until a new, higher dynamic capacitance level is granted. Throttling the pipeline, however, may reduce both performance and energy efficiency.

Workload dynamic capacitance characteristics may vary rapidly for real workloads. In computers with large numbers of central processing units (CPUs) or with individual CPUs having multiple cores, it may be impractical for a central power control unit to reevaluate granted dynamic capacitance levels and make DVFS adjustments at the rate necessary to achieve high performance and efficiency. That is, a centralized power control system may scale poorly with respect to the number of entities that it controls and the time scale of the workload phases to be managed.

BRIEF DESCRIPTION OF THE DRAWINGS

The various advantages of the embodiments will become apparent to one skilled in the art by reading the following specification and appended claims, and by referencing the following drawings, in which:

DESCRIPTION OF EMBODIMENTS

Figure 1:
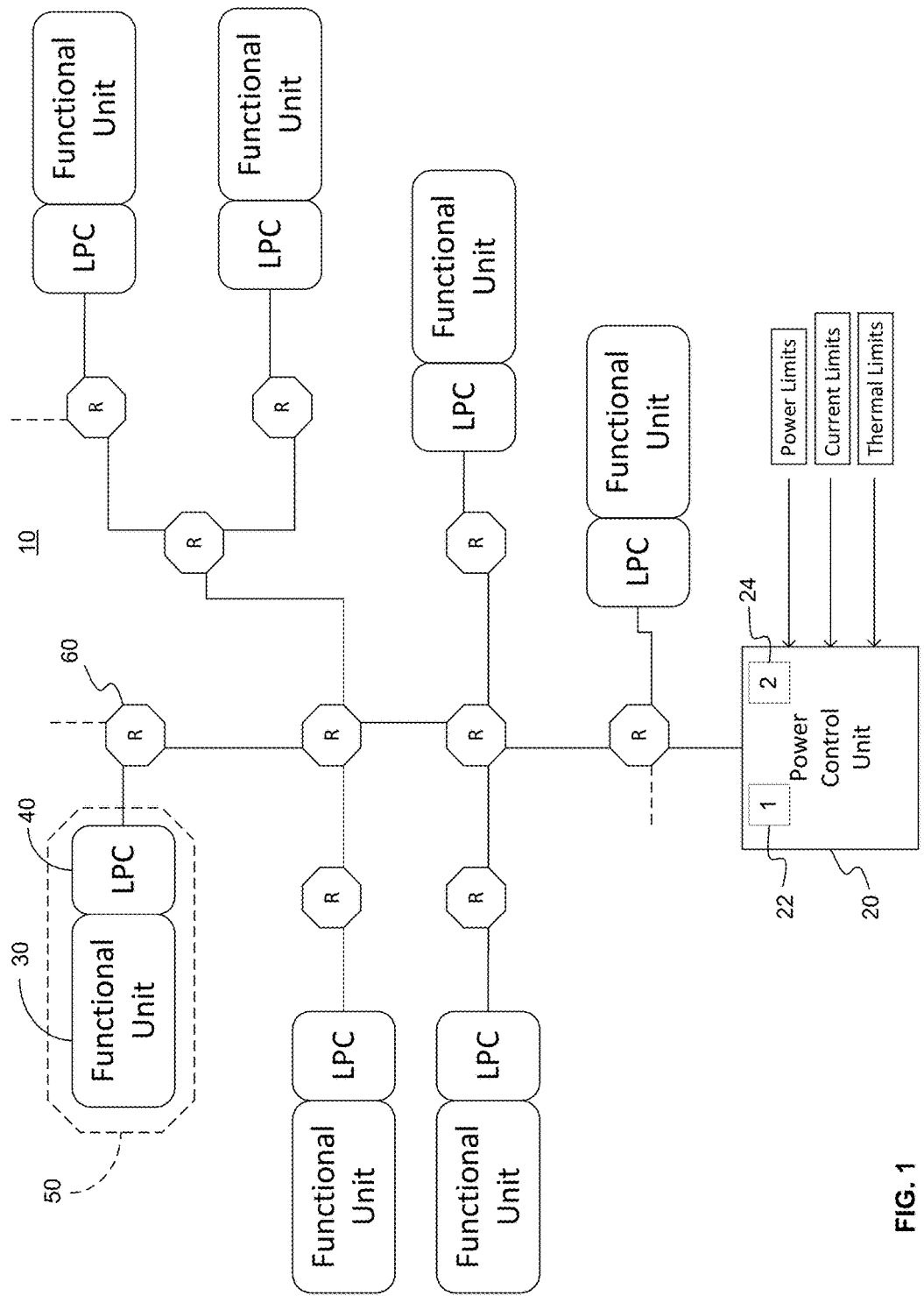
FIG. 1 is an illustration of an example of power allocation according to an embodiment.

Turning now to the drawings in detail, FIG. 1 depicts a power allocation system 10 that may grant power levels and/or dynamic capacitance ($C_{dyn}$) levels (e.g., power allowances). The power level/dynamic capacitance level is granted to each functional unit 30 (e.g., computer component) within the system 10. The functional units 30 may include system components such as, for example, a central processing unit (CPU, e.g., host processor), a core of a central processing unit (for a CPU with multiple cores), a memory component, a network interface component, a chip set, a system circuit, or any other system element that draws current from a power supply. A central power control unit 20 may include a first portion 22 that grants the power level/dynamic capacitance level. A second portion 24 of the central power control unit 20 may allocate power to a shared power pool that may be accessed by the functional units 30 through local power control units (LPCs) 40, to be discussed in more detail below. The first portion 22 and the second portion 24 of the central power control unit 20 may be collocated within the central power control unit 20 and may represent different logical operations of the central power control unit 20 or they may be physically separate locations or components within the central power control unit 20. Each functional unit 30 and a local power control unit 40 may form an agent 50 within the illustrated system 10. The central power control unit 20, the functional unit 30, and the local power control unit 40 may be integrated as a system on a chip (SoC).

The system 10 may optionally form a part of a distributed computing system. The expression "distributed computing system" may relate to a system with interconnected processors that communicate and coordinate their actions in order to achieve a common goal. In one example, a distributed computing system may utilize component groups to handle work according to various computational topologies and architectures. For example, an application may be divided into various tasks that may be subdivided into groups of related subtasks (e.g., threads), which may be run in parallel on a computational resource. Related threads may be processed in parallel with one another on different components as "parallel threads," and the completion of a given task may entail the completion of all of the related threads that form the task. Alternatively, parallel threads may be processed on different cores in the same CPU.

The shared power pool allocated by the second portion 24 of the central power control unit 20 may be quickly accessed by one or more functional units 30 when there is a need to exceed the granted power level/dynamic capacitance level more rapidly than a new grant request would take to process. In this manner, the functional units 30 may not need to throttle their respective dynamic capacitance levels while waiting for a grant of a new dynamic capacitance level by the central power control unit 20.

The illustrated system 10 has a topology in which the agents 50 are interconnected through routers 60 such that local power control units 40 may bidirectionally communicate with one another and with the central power control unit 20. The depicted topology is for illustration purposes only and any topology such as, for example, a ring, star, mesh, etc. or combination thereof.

Figure 2:
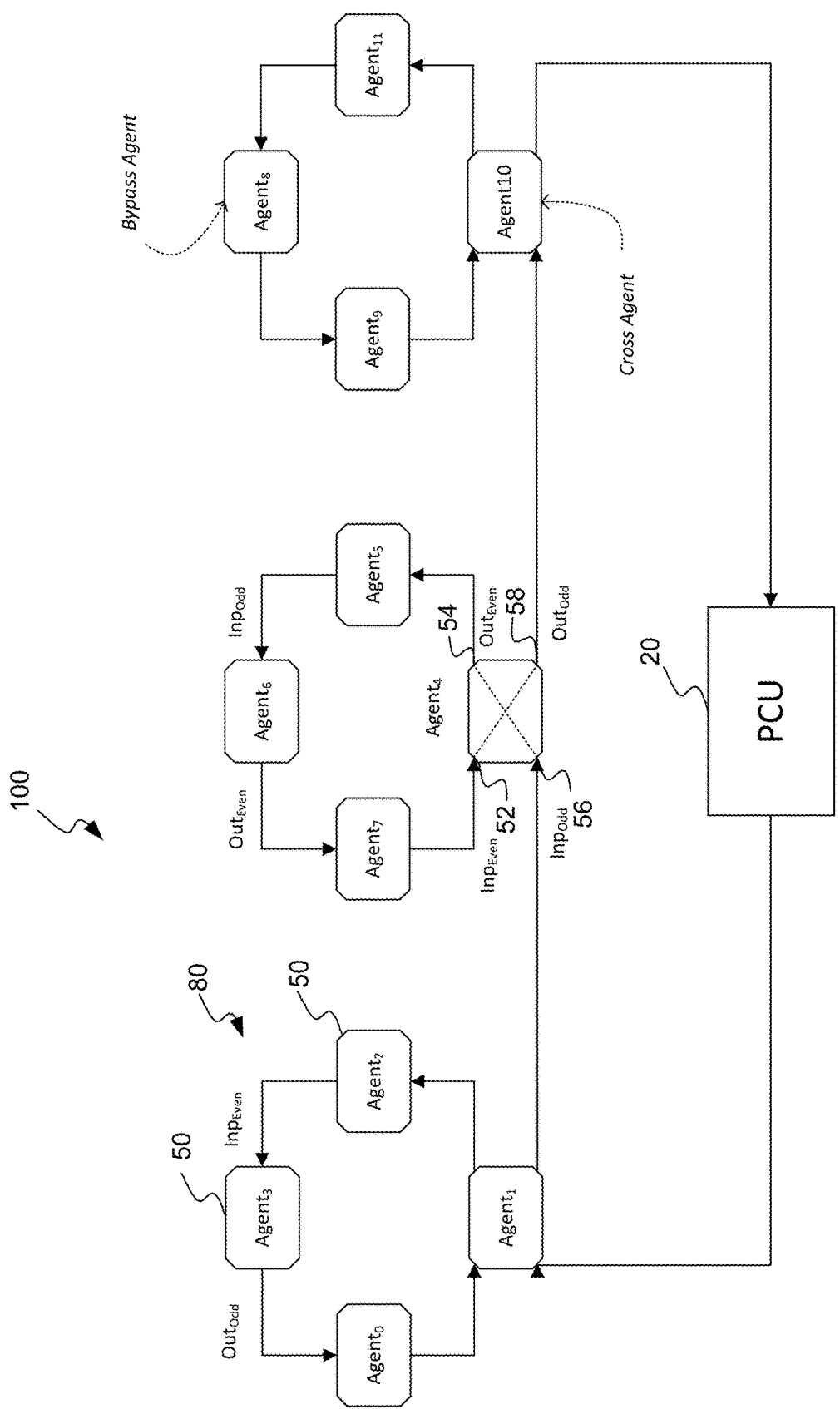
FIG. 2 is an illustration of an example of power allocation according to a further embodiment.

The system 10 may be configured as a hierarchical virtual ring 100 as depicted in FIG. 2. The virtual ring 100 may include, for example, three rings 80 of four agents 50. In this embodiment, the allocated shared power pool is distributed in the form of power credits that may be distributed from the central power control unit 20 to the local power control units 40 of agents 50. The local power control unit 40 of each agent 50 may support a power credit input port 52 ($Inp_{Even}$) and a power credit output port 54 ($Out_{Even}$). Dynamic available power credits are received through input ports. An agent 50 may request additional power credits that will pass through the power credit input port 52 until the functional unit 30 of that agent no longer requires supplemental power. When received power credits are not needed by the agent 50, they may be forwarded to the next agent 50 in the ring. That is, a functional unit 30 may relinquish power credits when the granted power is sufficient to support its operations.

An exemplary power credit message may include: a source agent ID whose size is system dependent; a destination agent ID whose size is system dependent; a number of credits as an unsigned integer of at least one bit; a generation tag that is an unsigned integer of at least one bit; a minimum number of hops as an unsigned integer with a system dependent size; and a number of hops as an unsigned integer with a system dependent size.

Two input ports may be defined based on the message source-agent IDs: an even input port 52 and an odd input port 56 ($Inp_{Odd}$). Similarly, two output ports may be defined based on the message source-agent IDs: an even output port 54 and an odd output port 58 ($Out_{Odd}$). The illustrated local power control unit 40 of the agent 50 defines four control registers for power credit routing: InputEvenID, InputOddID, OutputEvenID, and OutputOddID. Unused power credits received through the even input port 52 may be forwarded through the odd output port 58. Conversely, unused power credits received through the odd input port 56 may be forwarded through the even output port 54.

Two types of agents 50 may be established based on the configuration of the agent input and output ports: cross agents and bypass agents. Cross agents populate all four routing control agents with valid agent IDs (e.g., all four types of input and output ports 52, 54, 56, and 58). Bypass agents may only configure one input port (e.g., even input port 52) and its complementary output port (e.g., odd output port 58).

When an agent 50 no longer needs one or more previously absorbed power credits, it may inject the credit(s) back into the ring 80 using either the even or odd output port (54 and 58, respectively). The output port selected to inject the power credit may be based on a local power control unit control register that may be either statically defined or dynamically adjusted by the central power control unit 20.

Figure 3:
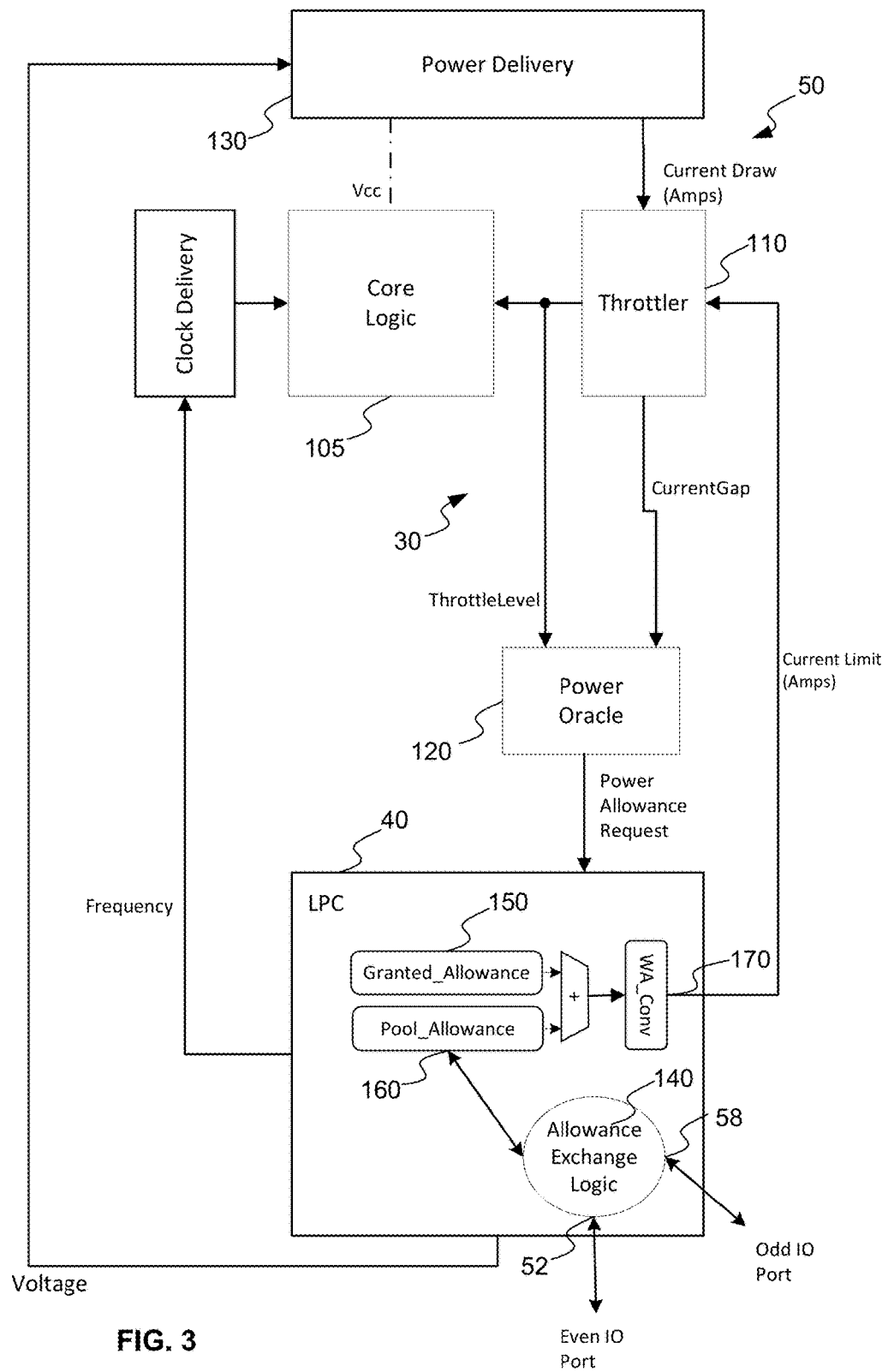
FIG. 3 is an illustration of an example of an agent used in the power allocation of FIG. 2.

Turning to FIG. 3, an agent 50 is depicted in more detail. Each agent 50 may implement logic to self-regulate its power consumption while at the same time establishing whether to request a higher or lower power level/dynamic capacitance level from the central power control unit 20. The illustrated agent 50 includes a local power control unit 40 and a functional unit 30 that includes at least a core logic component 105 and, optionally, throttler logic 110, and a power oracle 120. As described above, the functional unit 30 may be selected from a variety of computer components (including processor cores) and is the component for which power may be allocated by the central power control unit 20 (FIGS. 1 and 2). The throttler logic 110 may be configured to dynamically cap the activity of the core logic to avoid drawing more than the allowed amount of current. The power oracle 120 may use a throttling level indication to increase or decrease power allocation through power requests to the local power control unit 40.

A power delivery subsystem 130 may provide current consumption telemetry which may require a power (watts) to current (amps) conversion in the local power control unit 40. If the power delivery subsystem 130 provides power consumption telemetry, then conversion between power and current may be bypassed. If the power delivery subsystem 130 provides neither power nor current telemetry, a digital estimation of current or power may be implemented based on core logic 105 telemetry.

The power oracle 120 may use a throttle level and current gap to determine power requirements for core logic component 105. If the throttle level is greater than or equal to the maximum throttle level, then a power request may be made for an amount of power equal to the current power plus a power delta where the power delta is estimated based on the temporary current gap between the core logic component 105 demand and the current limit (as set by the central power control unit 20. When the core logic component 105 is consuming substantially less current that allocated by the central power control unit 20, power credits are released by the illustrated local power control unit 40 back into a ring such as, for example, the ring 100 (FIG. 2). Power credits may be released according to the formula: if (current limit−current draw)>surplus threshold then power request=current power−red coefficient*power delta where the red coefficient is a tunable parameter used to adjust the aggressiveness of the release of power credits back into the ring.

The local power control unit 40 may include allowance exchange logic 140 that communicates with even input port 52 and a granted power allowance member 150 and pool allowance member 160. The granted allowance member 150 may store information related to the granted power allowance while the pool allowance member 160 may track power credit information. Members 150 and 160 communicate with a converter 170 which in turn communicates with the throttle logic 110 to regulate power.

Figure 4:
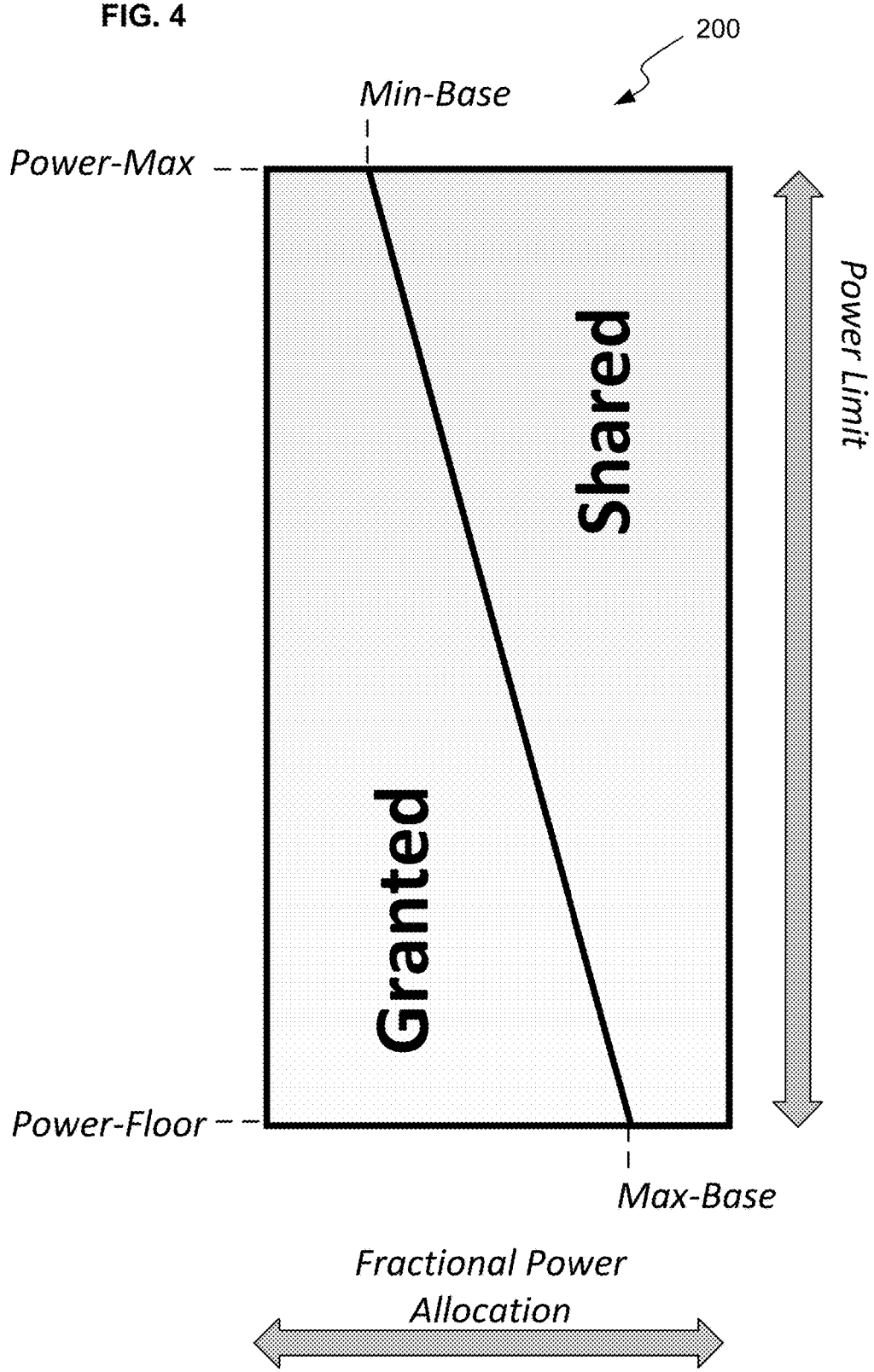
FIG. 4 is a graph of an example of granted and shared power by a central power control unit according to an embodiment.

Turning to FIG. 4, the ratio between granted power to components and a shared power pool is depicted in graph 200. The amount of available power that is granted by the central power control unit to the components vs. the shared power pool to be managed by the local power control units 40 may be a static design choice or adjusted dynamically by a central power control unit heuristic. In one aspect, an inversely proportional allocation may be used. For inversely proportional allocation, the shared power pool may be inversely proportional to a power limit applied with respect to a maximum power of the system. Using this heuristic, when little power is available, the power is used almost entirely to guarantee a minimum level of performance of the system while leaving a small power pool to absorb small transient power demand spikes from the functional units 30 (FIGS. 1 and 3). Conversely, when more power head-room is available, more performance flexibility is injected into the system by having a larger fraction as a shared power pool.

In another aspect, incremental allocation may be used. With continuing reference to FIGS. 2 and 4, in a virtual ring routing configuration, a typical latency L for a power credit message to traverse the ring and be received back by the central power control unit 20 may be calculated. The central power control unit 20 may maintain a counter of injected power credits in the last L seconds (or equivalent cycles) as an approximate number of free power credits (FC) in the system. When FC<Minimum Credits Threshold, then the central power control unit 20 will deallocate some of the granted power and inject additional power credits into the shared power pool. Conversely, when FC>Maximum Credits Threshold, the power control unit 20 will remove power credits from the shared power pool and allocate them to the granted power.

In another aspect dynamic changing shared power may be used. In a dynamic shared power scheme, an event may require changing the overall amount of power in the shared power pool. At an arbitrary point in time, power credits may be allocated at different agents 50 or be circulating across a ring.

Figure 5:
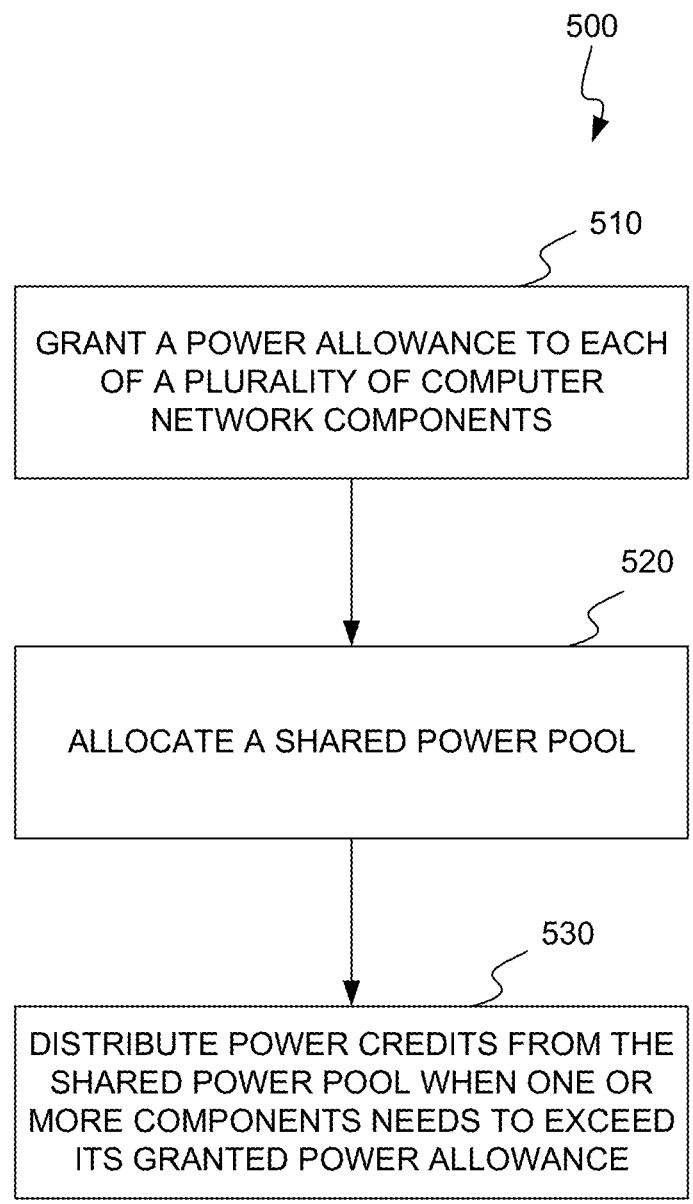
FIG. 5 is a flowchart of an example of a method of conducting power allocations according to an embodiment.

FIG. 5 shows an overview of a method 500 of allocating power in a computer system. The method 500 may generally be implemented in an apparatus such as, for example, the central power control unit 20 (FIG. 1), already discussed. More particularly, the method 500 may be implemented in one or more modules as a set of logic instructions stored in a machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality logic hardware using circuit technology such as, for example, application specific integrated circuit (ASIC), complementary metal oxide semiconductor (CMOS) or transistor-transistor logic (TTL) technology, or any combination thereof. For example, computer program code to carry out operations shown in method 500 may be written in any combination of one or more programming languages, including an object oriented programming language such as JAVA, SMALLTALK, C++ or the like and conventional procedural programming languages, such as the "C" programming language or similar programming languages.

With continuing reference to FIGS. 1, 2, and 5, illustrated processing block 510 provides for granting a power allowance to each of a plurality of computer components such as a functional unit 30. The grant may be of a power level or in the form of a dynamic capacitance level for the component.

Illustrated processing block 520 allocates a shared power pool that is part of the total power that may be allocated by the central power control unit 20. This shared power pool may allow local access by functional units 30 to power without the need to request a new power level/dynamic capacitance level from the central power control unit 20.

Illustrated block 530 distributes power credits from the shared power pool when one or more components/functional units 30 needs to exceed its granted power allowance.

In an example of power credit distribution, the central power control unit 20 may maintain a valid "credit generation tag" unsigned integer. This value may be zero at rest and increments each time the shared power pool amount changes (with wrap around). Credits injected into the system 10 by the central power control unit 20 may be tagged with the current generation value. Central power control unit generation tag changes may be broadcasted to all local power control units 40. The local power control unit 40 may clear any allocated shared power when a new generation tag is received. Power credit messages received through the input ports may be dropped if their generation tag does not match the latest generation tag broadcast by the central power control unit 20. Latency between generation tag wrapping around may be larger than the worst case latency for the system broadcasting a new generation tag to all the local power control units 40 plus any power credit messages in a ring moving from one agent 50 to the next.

When multiple agents 50 require additional power from the shared power pool, the determination of agents that receive power credits may depend on timing and ring routing. To increase fairness across agents on the usage of shared power, the central power control unit 20 may inject a credit message into the system with the "hops" field set to zero and the "minimum hops" field set to a random value between zero and N−1 where N is the number of agents 50 in the virtual ring. When an agent 50 receives a credit message, it may only absorb the credit message if the field "hops" is equal to or larger than the "minimum hops". When a credit message is forwarded by an agent 50, the field "hops" is incremented. This mechanism may ensure that a randomized agent is the first agent to have the opportunity to absorb a power credit rather than a routing-dependent sequence of agents. When allocated credits are re-injected into the ring by an agent, the field "hops" is cleared and "minimum hops" is set to zero.

In an alternative embodiment, agents may implement a periodic release of shared power pool power credits back into the ring. In such an example, a timer with a programmable delay may be armed when shared credits in an agent 50 is greater than zero. At timer expiration, one credit may be injected back into the ring and the time rearmed. Use of a timer may guarantee some degree of recirculation of shared power from the shared power pool after it is initially allocated.

ADDITIONAL NOTES AND EXAMPLES

Example 1 may include a computer system comprising a plurality of computer components, a central power control unit to grant a power allowance to each of the plurality of computer components and to allocate a shared power pool locally accessible to each of the plurality of computer components when one or more of the plurality of components needs to exceed its granted power allowance, and one or more local power control units in communication with each of the plurality of components to manage the shared power pool.

Example 2 may include the computer system of example 1, wherein the one or more local power control units is configured to distribute power credits to the plurality of components from the shared power pool.

Example 3 may include the computer system of example 1, further comprising logic within each of the plurality of components to request a higher power allowance from the central power control unit for the component.

Example 4 may include the computer system of example 3, wherein the request for a higher power allowance is in the form of a request for an increase in a dynamic capacitance level of the component.

Example 5 may include the computer system of example 1, further comprising a communication path among the one or more local power control units and the central power control unit to carry messages between the local power control units and the central power control unit and among the local power control units.

Example 6 may include a power control apparatus comprising a first power control portion to grant a power allowance to each of a plurality of computer components, and a second power control portion to allocate a shared power pool locally accessible to each of the plurality of computer components when one or more of the plurality of components needs to exceed its granted power allowance.

Example 7 may include the power control apparatus of example 6, wherein the shared power pool comprises power credits issued by the second power control portion to local power control units.

Example 8 may include the power control apparatus of example 6, wherein the first power control portion is configured to change a dynamic capacitance of one or more of the plurality of computer components in response to a request from one or more of the plurality of computer components.

Example 9 may include the power control apparatus of example 7, wherein the power control apparatus includes logic to inject additional power credits or remove power credits to balance component power requirements.

Example 10 may include a method to access power in a computer system comprising granting a power allowance to each of a plurality of computer components, allocating a shared power pool, and distributing power credits to one or more local power control units associated with one or more of the plurality of components when one or more of the components needs to exceed its granted power allowance.

Example 11 may include the method of example 10, wherein the one or more local power control units distributes received power credits to the one or more of the plurality of computer components.

Example 12 may include the method of example 10, further comprising requesting a higher power allowance from the central power control unit for the component.

Example 13 may include the method of example 12, wherein the requesting is in the form of requesting an increase in a dynamic capacitance level of the component.

Example 14 may include the method of example 10, further comprising communicating power credit messages between the one or more local power control units and the central power control unit.

Example 15 may include the method of example 10, further comprising communicating power credit messages among the local power control units.

Example 16 may include the method of example 10, further comprising injecting additional power credits or removing power credits to balance component power requirements.

Example 17 may include at least one computer readable storage medium comprising a set of instructions, wherein the instructions, when executed, cause a central power control unit to grant a power allowance to each of a plurality of computer components, allocate a shared power pool, and distribute power credits from the shared power pool to one or more local power control units associated with one or more of the plurality of components when one or more of the components needs to exceed its granted power allowance.

Example 18 may include the at least one computer readable storage medium of example 17, wherein the power credits are distributed to one or more local power control units to be used by one or more computer components.

Example 19 may include the at least one computer readable storage medium of example 17, wherein the instructions, when executed, cause the central power control unit to inject additional power credits or remove power credits to balance component power requirements.

Example 20 may include the at least one computer readable storage medium of example 17, wherein the instructions, when executed, cause the central power control unit to communicate power credit messages to one or more local power control units.

Example 21 may include the at least one computer readable storage medium of example 17, wherein the instructions, when executed, cause the central power control unit to grant a higher power allowance to a computer component.

Example 22 may include the at least one computer readable storage medium of example 17, wherein the instructions, when executed, cause the central power control unit to grant a higher dynamic capacitance level to a computer component.

Example 23 may include a power control apparatus comprising means for granting a power allowance to each of a plurality of computer components, means for allocating a shared power pool, and means for distributing power credits from the shared power pool to one or more local power control units associated with one or more of the plurality of components when one or more of the components needs to exceed its granted power allowance.

Example 24 may include the power control apparatus of example 23, further comprising means to distribute the power credits to one or more local power control units to be used by one or more computer components.

Example 25 may include the power control apparatus of example 23, further comprising means to inject additional power credits or remove power credits to balance component power requirements.

Example 26 may include the power control apparatus of example 23, further comprising means to communicate power credit messages to the one or more local power control units.

Example 27 may include the power control apparatus of example 23, further comprising means to grant a higher power allowance to a computer component.

Example 28 may include the power control apparatus of example 23, further comprising means to grant a higher dynamic capacitance level to a computer component.

The present embodiments may eliminate the situation in which agents must throttle their dynamic capacitance for the entire time that their dynamic capacitance would result in unsafe operation until the central power control unit responds granting a new power level/dynamic capacitance level. Using the present embodiments, agents may avoid throttling as long as there is sufficient power in the pool of shared power. Overall, there may be a significant reduction in the time that dynamic capacitance throttling is used to limit current and significant increase in the time that DVFS mechanisms are used instead. Accordingly better performance and efficiency may be achieved. While the amount of shared power may be managed by a centralized entity (the central power control unit), the allocation and de-allocation mechanism may be fully decentralized which avoids scalability problems associated with sole use of a central power control unit.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The terms "coupled" and "communicating" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. A computer system comprising:
   a plurality of computer components;
   a central power control unit comprising circuitry configured to grant a power allowance to each of the plurality of computer components and to allocate a shared power pool locally accessible to each of the plurality of computer components without a request for a new power allowance to the central power control unit when one or more of the plurality of computer components needs to exceed its granted power allowance; and
   local power control units comprising circuitry configured to communicate with each of the plurality of computer components to manage the shared power pool,
   wherein the central power control unit is further configured to transmit a power credit message to a random local power control unit of the local power control units so that the random local power control unit is a first of the local power control units to be able to absorb a power credit associated with the power credit message.

2. The computer system of claim 1, wherein the local power control units are configured to distribute power credits to the plurality of computer components from the shared power pool.

3. The computer system of claim 1, further comprising:
   circuitry within each of the plurality of computer components configured to request a higher power allowance from the central power control unit for the component.

4. The computer system of claim 3, wherein the request for the higher power allowance for a respective computer component out of the computer components is in the form of a request for an increase in a dynamic capacitance level of the respective computer component.

5. The computer system of claim 1, further comprising a communication path among the local power control units and the central power control unit to carry messages between the local power control units and the central power control unit and among the local power control units,
   wherein the power credit message includes a minimum hops field set to a random value so that the random local power control unit is the first of the local power control units to be able to absorb the power credit associated with the power credit message.

6. A power control apparatus comprising:
   circuitry including:
   a first power control portion comprising circuitry configured to grant a power allowance to each of a plurality of computer components; and
   a second power control portion comprising circuitry configured to allocate a shared power pool locally accessible to each of the plurality of computer components without a request for a new power allowance to the power control apparatus when one or more of the plurality of computer components needs to exceed its granted power allowance,
   wherein the shared power pool comprises power credits issued by the second power control portion to local power control units,
   wherein the second power control portion is further configured to distribute at least one of the power credits to the local power control units so that a random one of the local power control units is a first of the local power control units to be able to absorb the at least one of the power credits.

7. The power control apparatus of claim 6, wherein the first power control portion is configured to change a dynamic capacitance of one or more of the plurality of computer components in response to a request from the one or more of the plurality of computer components.

8. The power control apparatus of claim 6, wherein the second power control portion is further configured to inject additional power credits or remove power credits to balance component power requirements.

9. A method to access power in a computer system comprising:
   granting, by a power control apparatus, a power allowance to each of a plurality of computer components;
   allocating, by the power control apparatus, a shared power pool;
   distributing power credits from the shared power pool to local power control units associated with the plurality of computer components without a request for a new power allowance to the power control apparatus when one or more of the components needs to exceed its granted power allowance; and
   transmitting a power credit message to a random local power control unit of the local power control units so that the random local power control unit is a first of the local power control units to be able to absorb a power credit associated with the power credit message.

10. The method of claim 9, wherein the local power control units distribute received power credits to the one or more of the plurality of computer components.

11. The method of claim 9, further comprising:
requesting a higher power allowance from the power control apparatus for one of the computer components.

12. The method of claim 11, wherein the requesting is in the form of requesting an increase in a dynamic capacitance level of the one of the computer components.

13. The method of claim 9,
the method further comprising communicating messages, including the power credit message, between the local power control units and the power control apparatus, the power credit message including a minimum hops field set to a random value so that the random local power control unit is the first of the local power control units to be able to absorb the power credit associated with the power credit message.

14. The method of claim 9,
the method further comprising communicating power credit messages among the local power control units.

15. The method of claim 9, further comprising injecting additional power credits or removing power credits to balance component power requirements.

16. At least one non-transitory computer readable storage medium comprising a set of instructions, wherein the instructions, when executed, cause a central power control unit to:
grant a power allowance to each of a plurality of computer components;
allocate a shared power pool;
distribute power credits from the shared power pool to local power control units associated with the plurality of computer components without a request for a new power allowance to the central power control unit when one or more of the computer components needs to exceed its granted power allowance; and
transmit a power credit message to a random local power control unit of the local power control units so that the random local power control unit is a first of the local power control units to be able to absorb a power credit associated with the power credit message.

17. The at least one non-transitory computer readable storage medium of claim 16, wherein the power credits are distributed to the local power control units to be used by the computer components.

18. The at least one non-transitory computer readable storage medium of claim 16, wherein the instructions, when executed, cause the central power control unit to inject additional power credits or remove power credits to balance component power requirements.

19. The at least one non-transitory computer readable storage medium of claim 16, wherein the instructions, when executed, cause the central power control unit to communicate messages, including the power credit message, to the local power control units, the power credit message including a minimum hops field set to a random value so that the random local power control unit is the first of the local power control units to be able to absorb the power credit associated with the power credit message.

20. The at least one non-transitory computer readable storage medium of claim 16, wherein the instructions, when executed, cause the central power control unit to grant a higher power allowance to a computer component of the plurality of computer components.

21. The at least one non-transitory computer readable storage medium of claim 16, wherein the instructions, when executed, cause the central power control unit to grant a higher dynamic capacitance level to a computer component of the plurality of computer components.

\* \* \* \* \*